US008150546B2

(12) United States Patent
Tsujimoto

(10) Patent No.: US 8,150,546 B2
(45) Date of Patent: Apr. 3, 2012

(54) ARTICLE TRANSPORTING APPARATUS AND METHOD OF OPERATING THE APPARATUS

(75) Inventor: Kazushi Tsujimoto, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 444 days.

(21) Appl. No.: 12/417,091

(22) Filed: Apr. 2, 2009

(65) Prior Publication Data
US 2009/0188774 A1    Jul. 30, 2009

Related U.S. Application Data

(62) Division of application No. 11/451,145, filed on Jun. 12, 2006, now Pat. No. 7,693,600.

(30) Foreign Application Priority Data

Jun. 15, 2005  (JP) ................................. 2005-175319
Jun. 20, 2005  (JP) ................................. 2005-179339

(51) Int. Cl.
*G06F 7/00* (2006.01)
(52) U.S. Cl. ....................................................... 700/218
(58) Field of Classification Search .................. 700/218, 700/213, 228
See application file for complete search history.

(56) References Cited

U.S. PATENT DOCUMENTS

| 2004/0254674 A1* | 12/2004 | Nojo et al. ..................... 700/213 |
| 2005/0060069 A1* | 3/2005 | Breed et al. ..................... 701/29 |
| 2005/0125089 A1* | 6/2005 | Puri et al. ........................ 700/96 |
| 2007/0293978 A1* | 12/2007 | Wurman et al. .............. 700/213 |

FOREIGN PATENT DOCUMENTS

| JP | 08-127407 | 5/1996 |
| JP | 10-255359 | 9/1998 |
| JP | 2857836 | 12/1998 |
| JP | 2000-309409 | 11/2000 |
| JP | 2002-175117 | 6/2002 |
| JP | 2003-070104 | 3/2003 |

* cited by examiner

*Primary Examiner* — Ramya Burgess
(74) *Attorney, Agent, or Firm* — The Webb Law Firm

(57) ABSTRACT

An article transporting apparatus, according to one preferred embodiment, includes:
 a plurality of movable bodies for transporting articles, the movable bodies being movable between a plurality of article transfer locations; and
 an operation controlling section for controlling the plurality of movable bodies so that the movable bodies effect article transporting operations in accordance with an article transport request information;
 wherein the operation controlling section selects a movable body from the group of movable bodies for an article transporting operation, based on an operation condition configured to cause each of the movable bodies to have a different past operation history such that a timing for replacing a replaceable part for one movable body is different from replacement timings for other movable bodies.

8 Claims, 12 Drawing Sheets

FIG.5 simultaneous storing operation

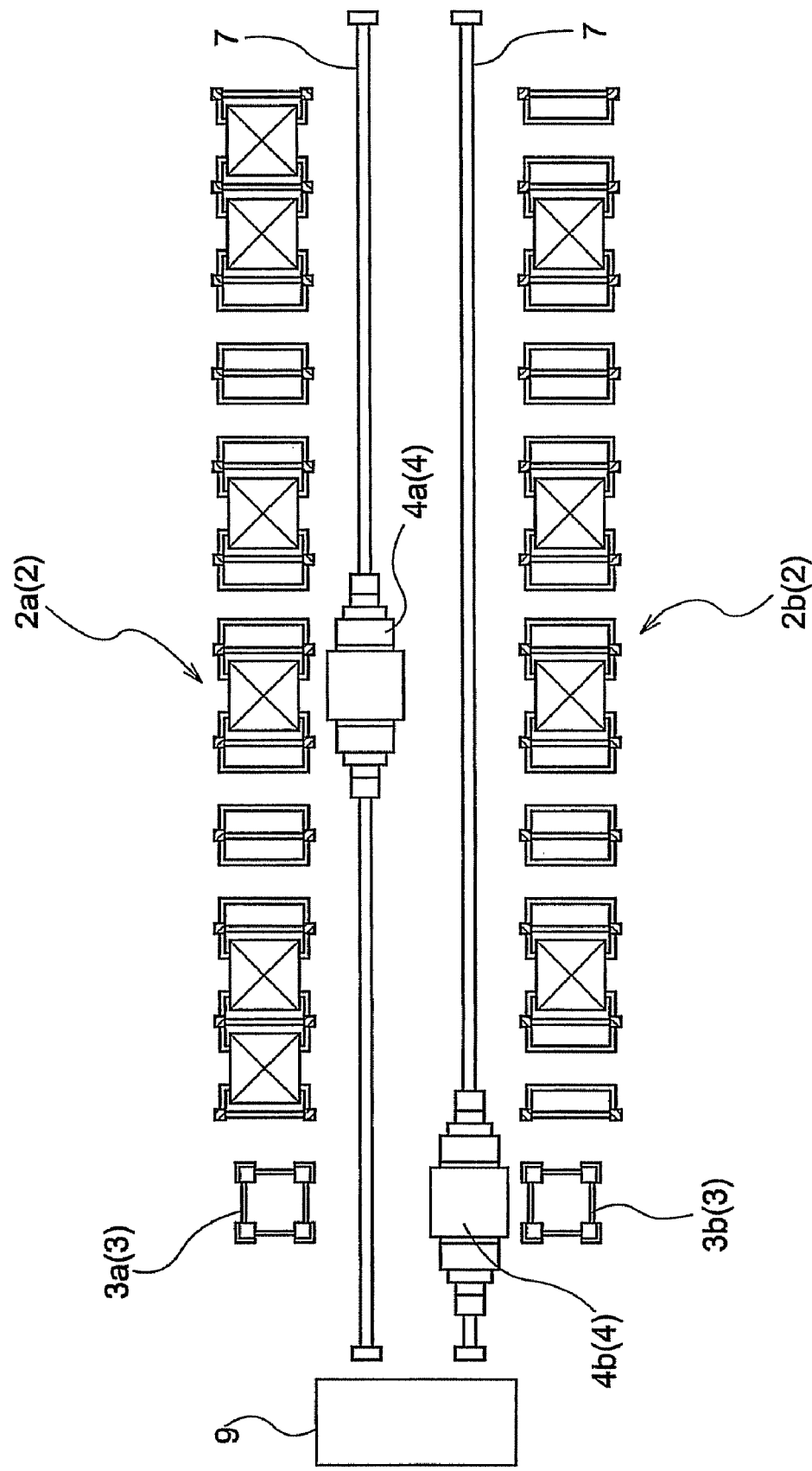

ARTICLE TRANSPORTING APPARATUS AND METHOD OF OPERATING THE APPARATUS

CROSS REFERENCE TO RELATED APPLICATION

This application is a divisional application of U.S. patent application Ser. No. 11/451,145, filed Jun. 12, 2006, which claims priority from Japanese Patent Application No. 2005-175319, filed Jun. 15, 2005, and Japanese Patent Application No. 2006-179339, filed Jun. 20, 2005.

BACKGROUND OF THE INVENTION

The present invention relates to an article transporting apparatus and its operating method. More particularly, this invention relates to an article transporting apparatus including a plurality of movable bodies for transporting articles, the movable bodies being movable between a plurality of article transfer locations and an operation controlling means for controlling the plurality of movable bodies so that the movable bodies effect article transporting operations in accordance with an article transport request information.

With the article transporting apparatus of the above type, each one of the plurality of article transporting bodies is movable between a plurality of article transfer locations for effecting an article transporting operation. As article transporting operations are effected with using the plurality of such movable bodies, the apparatus can achieve improved transporting ability.

According to a known article transporting apparatus of this type, a pair of movable bodies are adapted to be movable along a same track and the operation controlling means is configured to select both or one of the paired movable bodies for an article transporting operation(s) (see e.g. Japanese Patent No. 2857836).

The article transporting apparatus disclosed in the above document includes some equipments (replaceable components or parts) such as a sensor, a brake, etc. which are worn with implementation of each article transporting operation. As these equipments are worn with use, they need to be replaced by new ones before expiration of their service lives. Then, when the used period of such equipment reaches a predetermined period, this equipment is replaced by a new one. For this replacement, a movable body including this particular equipment is temporarily put out of its article transporting service and moved to an evacuation area, where the replacement operation of the equipment is effected.

In the case of the article transporting apparatus known from the above document, its operation controlling means is adapted simply for selecting one or both of paired movable bodies to cause it or them to effect an article transporting operation, based on article transport request information. Hence, it can sometimes happen that the two movable bodies have same past operation history such as a same number of article transporting operations which have been effected respectively thereby.

If this happens, the used periods of the equipments (replaceable parts) of these two movable members are identical, thus, the replacement timings thereof are set same. Therefore, both movable bodies will be temporally put out of the article transporting service to allow the replacement operations of the equipments of these two movable bodes to be effected at one time.

The above situation can be a problem with some systems employing such article transporting apparatus which need to effect article transporting operations constantly in a continuous manner without any interruption or suspension thereof. The above-described conventional apparatus may not satisfy this need.

On the other hand, in some cases, if replacement timings of their equipments differ from each other among a plurality of movable bodies, this can make the replacement operations troublesome. In such case, it is desired for the replacement timings of the equipments of the movable bodies to coincide with each other.

SUMMARY OF THE INVENTION

The present invention has been made to address to the above-described problems One object of this invention is to provide an article transporting apparatus which allows replacement operations of equipments of a plurality of movable bodies, while allowing article transporting operation thereof to proceed continuously.

For accomplishing the above object, according to the present invention, an article transporting apparatus comprises:

a plurality of movable bodies for transporting articles, the movable bodies being movable between a plurality of article transfer locations; and operation controlling means for controlling the plurality of movable bodies so that the movable bodies effect article transporting operations in accordance with an article transport request information;

wherein the operation controlling means selects a movable body from the plurality of movable bodies for an article transporting operation based on a first operation condition configured to cause each of the movable bodies to have a different past operation history such that a timing for replacing a replaceable part for one movable body is different from replacement timings for other movable body or bodies.

With the above construction, when a service life of a replaceable part of one (or more) movable body is expired, the other movable bodies other than the one having the worn part can remain in the service line for continuing their article transporting operations and only the movable body (or bodies) having the worn part needs to be temporally put out of service for allowing the necessary replacement operation. Hence, the apparatus as a whole can provide constantly continuous article transporting operation.

Another object of the present invention is to provide an article transporting apparatus which can facilitate the replacement operations of respective replaceable parts of the plurality of movable bodies.

For accomplishing this object, an article transporting apparatus, according to the present invention, comprises:

a plurality of article transporting movable bodies movable along a single track between a plurality of article transfer locations; and operation controlling means for controlling operations of the movable bodies for causing the bodies to effect article transporting operations in accordance with an article transport request information;

wherein said operation controlling means selects a movable body from the plurality of movable bodies for an article transporting operation, based on a second operation condition configured to cause the movable bodies to have substantially the same past operation histories and moves the movable bodies not selected based on the second operation conditions out of an article transporting movable area in which the selected movable body is moved for effecting the article transporting operation.

This construction allows the replacement operations of the replaceable parts of the plurality of movable bodies to be effected at one time, thus facilitating the replacement operations of the replaceable parts of the plurality of movable bodies. The construction allows also the selected movable body to effect its article transporting operation efficiently without being blocked in its movement along the track by the non-selected movable bodies.

BRIEF DESCRIPTION OF THE DRAWINGS

FIG. 12 is a schematic plan view showing an article storage system relating to a further embodiment.

DETAILED DESCRIPTION OF PREFERRED EMBODIMENTS

An article transporting apparatus relating to the present invention, as employed in an article storage system, will be described with reference to the accompanying drawings.

Figure 1:
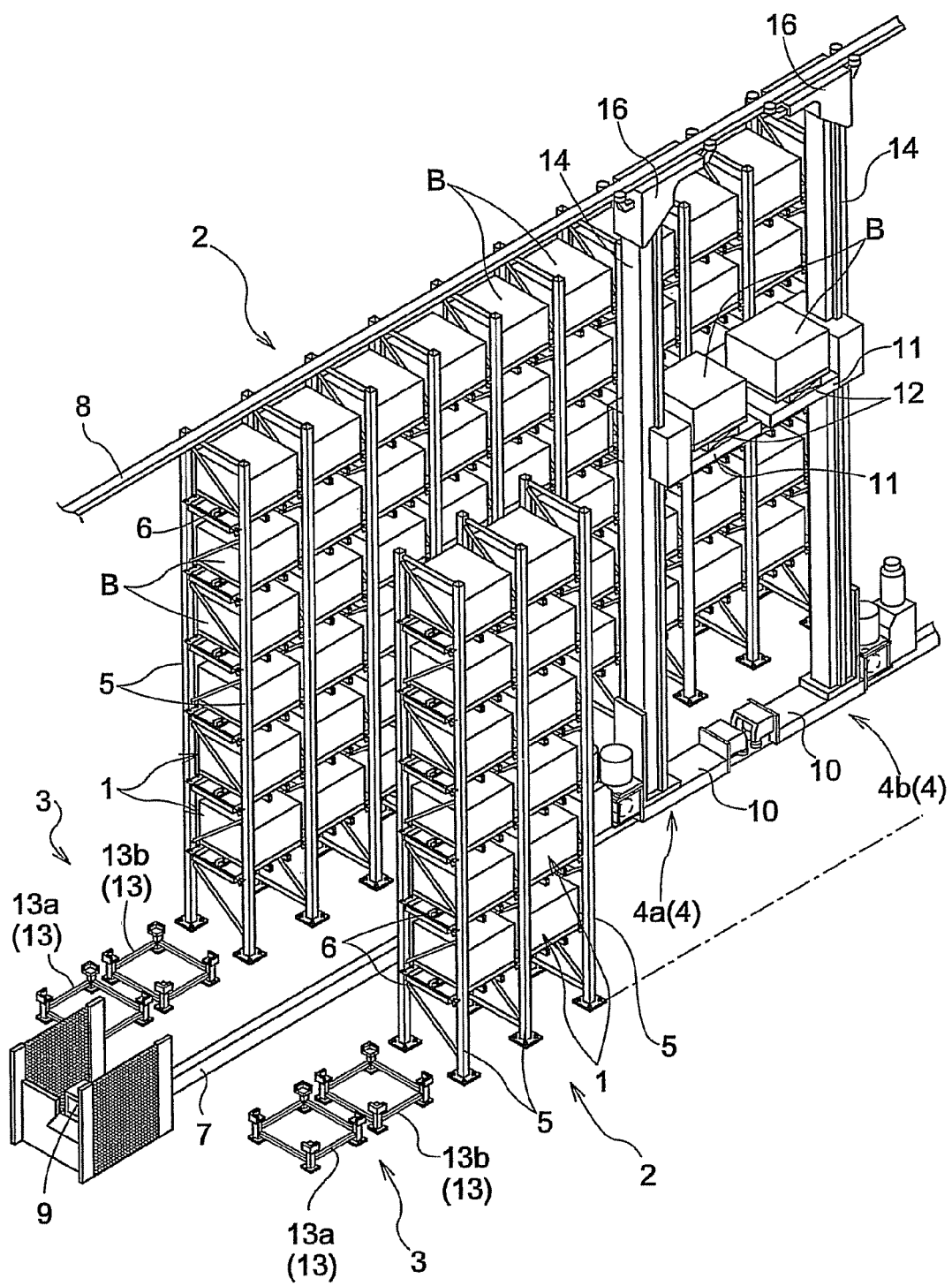
FIG. 1 is a perspective view of an article storage system.

This article storage system, as shown in FIG. 1, consists essentially of an article storage rack 2 having a plurality of storage sections 1 juxtaposed vertically and horizontally, and stacker cranes 4 as article transporting movable bodies for transporting article B between the article storage shelf 2 and a storage/retrieval article support 3.

The article storage shelf 2 includes a plurality of fore and aft pairs of masts 5 disposed erect and spaced along the horizontal direction, each fore and aft pair of masts 5 including a plurality of mounting portions 6 extending horizontally and spaced apart from each other vertically.

One pair of fore and aft masts 5 and one pair of right and left mounting portions 6 together constitute one storage section 1. And, a plurality of such storage sections 1 are juxtaposed vertically and laterally.

Referring to the article storage shelf 2, two of them are disposed and spaced apart from each other, with article access directions (directions for article storage and retrieval) thereof being opposed to each other. Referring to the storage/retrieval article support 3, two of them are disposed at a location horizontally adjacent the article storage shelf 2, e.g. a lateral side of the shelf 2, with the two support portions 3 being spaced apart and opposed to each other.

Each of the plurality of storage sections 1 of the article storage shelf 2 and each of the storage/retrieval article support 3 together constitutes what is referred to as an "article transfer location" herein.

Between the two article storage shelves 2, there is laid, on the floor surface, a running rail 7 as a "track" extending over the entire horizontal extension of the article storage shelves 2 and the storage/retrieval article support portions 3. On the upper level, there is provided a guide rail 8 also extending over the entire horizontal extension of the article storage shelves 2 and the storage/retrieval article support portions 3. In operation, each stacker crane 4 is movable on the running rail 7 while being guided by the guide rail 8.

Of opposed terminal ends of the running rail 7, at one end adjacent the storage/retrieval article support 3, there is provided a ground controller 9 which manages and controls operations of the stacker cranes 4. This ground controller 9 manages storage information such as information regarding which storage section 1 stores which article, etc.

Figure 2:
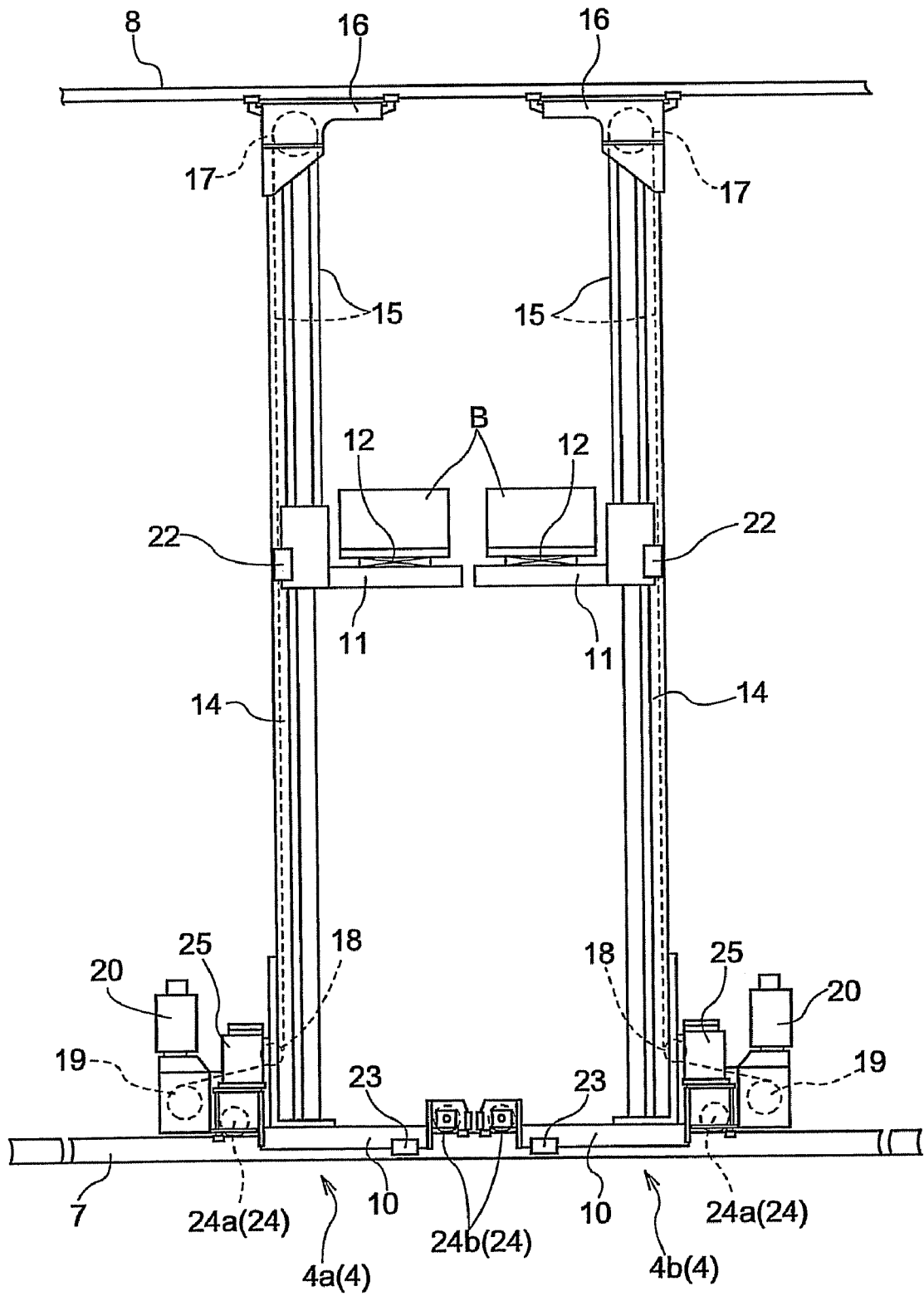
FIG. 2 is a side view of stacker cranes.

The stacker cranes 4 are provided as a pair both movable horizontally on the common running rail 7. Referring more particularly to these two stacker cranes 4, as shown in FIG. 2, each of these cranes 4 consists essentially of a horizontally movable running cart 10 as running along the running rail 7, a lift table 11 vertically movable relative to the running cart 10, and an article transfer device 12 (e.g. a fork type transfer machine) mounted on the lift table 11.

In operation of the stacker crane 4, with a horizontal movement of the running cart 10, a vertical (up/down) movement of the lift table 11, and a transfer movement of the transfer device 12, the stacker crane 4 effects a storage operation of storing an article B placed on the storage/retrieval article support 3 into a storage section 1 of the article storage shelf 2 or a retrieval operation of retrieving an article B stored at the storage section 1 of the article storage shelf 2.

Further, as the storage/retrieval article support 3, as shown in FIG. 1, there are provided two carriages 13 for placing the articles B thereon, the two carriages 13 being disposed side by side along the horizontal moving direction of the stacker crane 4. Hence, as the storage/retrieval article support 3 positions the two stacker cranes 4 in juxtaposition along the horizontal direction and each transfer device 12 provided in each crane can transfer the article B to and from the carriage 13.

In this embodiment, of the two stacker cranes 4, the one located on the side of the storage/retrieval article support 3 is designated as a first stacker crane 4a and the other located on the side of the article storage shelf 2 is designated as a second stacker crane 4b.

Of the two carriages 13, the one located distant from the article storage shelf 2 is designated as a first carriage 13a and the other located near the article storage shelf 2 is designated as a second carriage 13b.

The frit stacker crane 4a effects an article transporting operation between the first carriage 13a and the article storage shelf 2; whereas, the second stacker crane 4b effects an article transporting operation between the second carriage 13b and the article storage shelf 2.

The running cart 10 includes a single lift post 14 mounted erect for guiding and supporting the lift table 11, with the table 11 being liftable up/down relative thereto. The disposing position of this lift post 14 is set on the side in the horizontal moving direction of the stacker crane 4 opposite from the side where the other stacker crane 4 is located.

The lift table 11 is suspended by means of a lift chain 15. This lift chain 15, as being entrained around a guide sprocket 17 attached to an upper frame 16 which in turn is guided along the guide rail 8 and entrained around also a further guide sprocket 18 provided downwardly of the lift post 14, is operably coupled with a take-up drum 19 attached to one end of the running cart 10.

In operation, as the take-up drum 19 is driven to rotate in the forward/reverse direction by an inverter type lift electric motor 20, the lift chain 15 is paid out or taken up for lifting the lift table 11 up/down.

The lift table 11 mounts a lift rotary encoder 22 for detecting a lift(ed) position of the lift table 11 along its lift track.

Referring more particularly to this lift rotary encoder 22, though not shown in details in the figures, a rotary shaft of the lift rotary encoder 22 mounts a sprocket meshing with a chain disposed along the vertical direction of the lift post 14. As this sprocket is rotated in association with a lifting movement of the lift table 11, the encoder detects a lifted distance of the lift table 11 from a reference position set at the lower end of the lift track, thus determining the lifted position of the lift table 11.

The running cart 10 includes two front and rear wheels 24 capable of running on the running rail 7. Of these two wheels 24, the one wheel located at one end in the horizontal moving direction is constructed as a drive wheel 24a which is driven by an inverter type running electric motor 25, and the other wheel located at the other end in the horizontal moving direction is constructed as a freely rotatable, driven wheel 24b.

As the drive wheel 24a is driven forwardly or in reverse by the running electric motor 25, the running cart 10 is moved horizontally.

The running cart 10 mounts a running rotary encoder 23 for detecting a running position of the running cart 10 on the running track.

Referring more particularly to this running rotary encoder 23, though not shown in details in the figures, a rotary shaft of the running rotary encoder 23 mounts a sprocket meshing with a chain disposed along the running rail 7. As this sprocket is rotated in association with a horizontal running movement of the running cart 10, the encoder 23 detects a running (or traveled) distance of the running cart 10 from a reference position set at one end of the running rail 7, thus determining the running position of the running cart 10.

Figure 3:
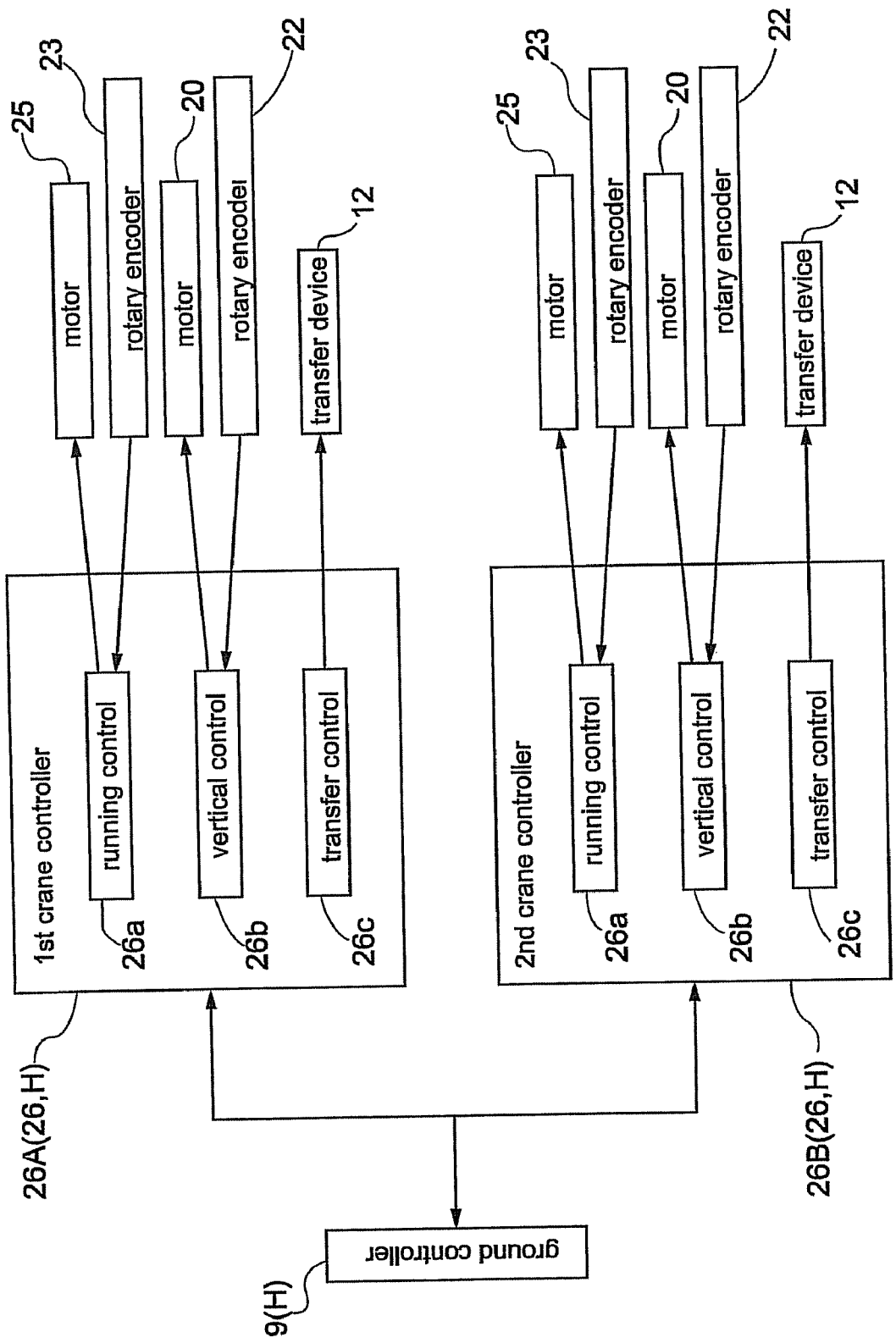
FIG. 3 is a block diagram of the article storage system.

Each one of the two stacker cranes 4, as shown in FIG. 3, mounts a crane controller 26 for controlling operations of this stacker crane 4. In this FIG. 3, the crane controller 26 mounted on the first stacker crane 4a is designated as a first crane controller 26A and the crane controller 26 mounted on the second stacker crane 4b is designated as a second crane controller 26B.

Each crane controller 26 is configured to receive the detection information from the lift rotary encoder 22 as well as the detection information from the running rotary encoder 23.

The first crane controller 26A and the second crane controller 26B have an identical construction.

In operation, the crane controller 26 controls the horizontal movement of the running cart 10 and the lift movement of the lift table 11 so as to move the transfer device 12 to an article transfer position of the storage shelf corresponding to each one of its plurality of storage sections 1 and a storage/retrieval article transfer position corresponding to the storage/retrieval article support 3. The crane controller 26 effects also an article transfer operation for controlling the transfer movement of the transfer device 12, so that the transfer device 12 located at the article transfer position of the shelf and the storage/retrieval article transfer position effects an article transfer operation to/from the storage section 1 and the storage/retrieval support 3.

More particularly, the shelf-side article transfer position and the storage/retrieval side article transfer position are positions determined respectively from a lift target stop position and a running target stop position. The storage/retrieval side article transfer position is set for each one of the two carriages 13; and for each one of these two carriages 13, the lift target stop position and the running target stop position are set. As for the shelf-side article transfer position, this is set for each one of the plurality of storage sections 1; and for each one of these storage sections 1, the lift target stop position and the running target stop position are set.

And, the crane controller 26 includes a running controller 26a for effecting a running control for controlling the horizontal movement of the running cart 10 so as to stop this running cart 10 at a running target stop position commanded based on the detection information from the running rotary encoder 23, a lift (vertical) controller 26b for effecting a lift control for controlling the lift movement of the lift table 11 so as to stop this lift table 11 at a lift target stop position commanded based on the detection information from the lift rotary encoder 22, a transfer controller 26c for effecting a transfer control for controlling the transfer movement of the transfer device 12 so as to effect an article transfer operation to/from the storage section 1 and the carriage 13, and so on.

In the running control by the running controller 26a, the running electric motor 25 is activated to start a horizontal movement of the running cart 10. Then, when the running position of the cart 10 detected by the running rotary encoder 23 reaches the commanded running target stop position, the running electric motor 25 is deactivated to stop the running cart 10 at this running target stop position. In this way, the running controller 26a controls the operations of the running electric motor 25.

In the lift control by the lift controller 26b, the lift electric motor 20 is activated to start a horizontal movement of the lift table 11. Then, when the lifted (vertical) position of the lift table 11 detected by the lift rotary encoder 22 reaches the commanded lift target stop position, the lift electric motor 20 is deactivated to stop the lift table 11 at this lift target stop position. In this way, the lift (vertical) controller 26a controls the operations of the lift electric motor 20.

Between each crane controller 26 and the ground controller 9, various kinds of information can be communicated. The ground controller 9 issues various commands to the two crane controllers 26, namely, the first crane controller 26A and the second crane controller 26B.

In response to associated commands issued from the ground controller 9, the crane controller 26 effects the running control by the running controller 26a, the lift control by the lift controller 26b and the transfer control by the transfer controller 26c.

In this way, the ground controller 9 and the two crane controllers 26 described above together constitute an "operation controlling means H" for controlling operations of the plurality of stacker cranes 4. In this specification, the language "controller" includes such hardware components as a microprocessor, a memory, a timer, a necessary communication circuit, etc and includes also a software for executing an algorithm to be detailed later. This controller per se is well-known. Instead, the operation controlling means H can be constituted of a single controller, such as the ground controller.

And, the operation controlling means H counts each article transfer operation when effected by the stacker crane 4 and adds up the number of such operations effected, thus managing "past operation history" of each of the two stacker cranes 4 recording the number of article transfer operations effected thus far by each stacker crane 4.

However, the past operation history is not limited to the number of article transfer operations effected, but can be a sum of operation periods or sum or total horizontally moved distance of the stacker crane 4. Or, this past operation history can also be a function of at least one selected from the group consisting of the number of operations effected, the sum of the operation periods, and the sum of the horizontal movement distances. In case the past operation history is the number of article transfer operations effected, for each issuance of article transport command to the stacker crane 4, this is counted and added up in a memory. Similarly, the operation period of the article transfer operation or the distance of horizontal movement when occurred, will be recorded in the summing memory.

The operation controlling means H is constructed so as to select one or both of the two stacker canes 4 as a selected stacker crane(s) 4 for effecting an article transfer operation(s), based on article transport request information.

The operation controlling means H, in the case of selecting one of the two stacker cranes 4 for causing it to effect an article transfer operation, selects one of the two stacker cranes 4 for its article transfer operation, makes this selection, based on "a past operation history varying operation condition" for causing the past operation histories of the two stacker cranes 4 different from each other for the purpose of rendering replacement timings of equipments (replaceable parts) of the respective stacker cranes 4 also different from each other.

The past operation history varying operation condition above is a target ratio between the past operation histories of the two stacker cranes 4. In this particular embodiment, this target ratio between a first past operation history Q1 of the first stacker crane 4a and a second past operation history Q2 of the second stacker crane 4b is set as Q1:Q2=25:24.

The operation controlling means H manages (records) these past operation histories Q1, Q2 of the two stacker cranes 4 and controls the operations of the two stacker cranes 4 so that the past operation history ratio (Q1:Q2) between the two stacker cranes 4 may be the target ratio (25:24).

In this way, based on the article transport request information and the past operation history varying operation condition, the operation controlling means H selects and executes one of a simultaneous storage operation, a first individual storage operation, a second individual storage operation, a simultaneous retrieval operation, a first individual retrieval operation, and a second individual retrieval operation.

The simultaneous storage operation and the simultaneous retrieval operation are the article transporting operations of the type for selecting both of the two stacker cranes 4 for causing them to effect article transporting operations.

The first individual storage operation and the first individual retrieval operation are the article transporting operations of the further type for selecting the first stacker crane 4a of the two stacker cranes 4 for causing it to effect an article transporting operation.

The second individual storage operation and the second individual retrieval operation are the article transporting operations of the still further type for selecting the second stacker crane 4b of the two stacker cranes 4 for causing it to effect an article transporting operation.

Figure 4:
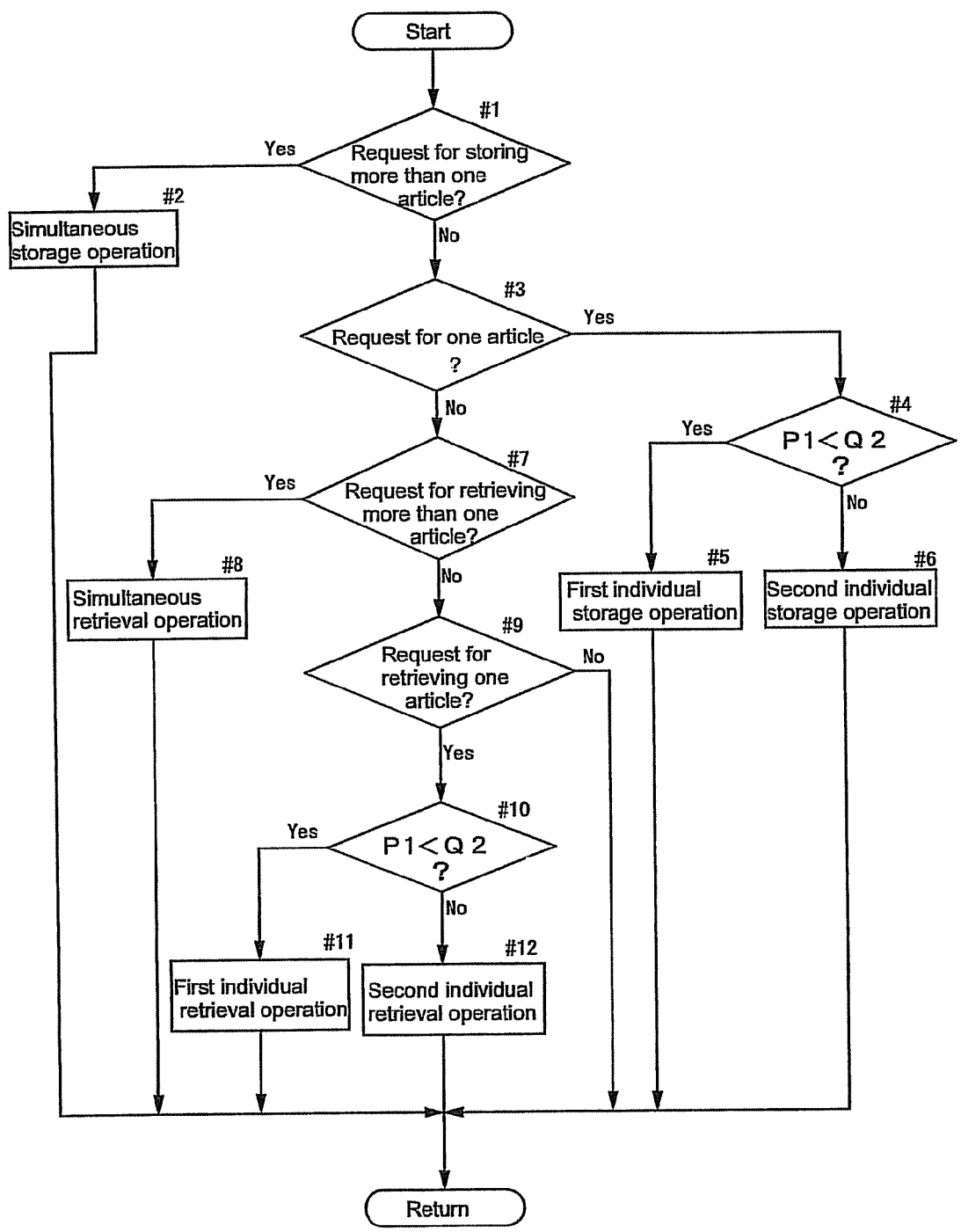
FIG. 4 is a flowchart illustrating control operations by operation controlling means.

Next, with reference to the flowchart shown in FIG. 4, there will be described which operation of the plurality of operations the operation controlling means selects and effects, based on the article transport request information and the past operation history varying operation conditions.

When the article transport request information requests storage of a plurality of articles B, the operation controlling means H selects and effects the simultaneous storage operation (steps #1 and 2).

When the article transport request information requests storage of one article B, then, the operation controlling means H checks whether a first target past operation history P1 (=Q1×24/25) obtained by multiplying the first past operation history Q1 of the first stacker crane 4a by the ratio (24/25) corresponding to the target ratio is smaller than the second past operation history Q2 of the second stacker crane 4b or not (steps #3, 4). If it is determined that the first target past operation history P1 is smaller than the second past operation history Q2, the operation controlling means H selects and effects the first individual storage operation (step #5). Whereas, if it is determined that the first target past operation history P1 is larger than the second past operation history Q2, the operation controlling means H selects and effects the second individual storage operation (step #6).

When the article transport request information requests retrieval of a plurality of articles B, the operation controlling means H selects and effects the simultaneous retrieval operation (steps #7, 8).

When the article transport request information requests retrieval of one article B, then, the operation controlling means H checks whether the first target past operation history P1 (=Q1×24/25) obtained by multiplying the first past operation history Q1 of the first stacker crane 4a by the ratio (24/25) corresponding to the target ratio is smaller than the second past operation history Q2 of the second stacker crane 4b or not (steps #9, 10). If it is determined that the first target past operation history P1 is smaller than the second past operation history Q2, the operation controlling means H selects and effects the first individual retrieval operation (step #11). Whereas, if it is determined that the first target past operation history P1 is larger than the second past operation history Q2, the operation controlling means H selects and effects the second individual retrieval operation (step #12).

The equipments ("replaceable parts) of the stacker cranes 4 actually comprise various sensors, brakes, etc, which are worn with use in article transporting operations, etc.

As the operation controlling means H makes selection between the two stacker cranes 4 for effecting an article transporting operation(s), based on the past operation history varying operation condition, the first past operation history Q1 of the first stacker crane 4a and the second past operation history Q2 of the second stacker crane 4b becomes: Q1:Q2=25:24. Therefore, it is possible to shorten the used period of the equipments of the second stacker crane 4b than those of the first stacker crane 4a, so that wear of the equipments of the second stacker cranes 4b can be restricted correspondingly.

And, in this particular embodiment, when the used period of the equipments of the first stacker crane 4a which is set longer reaches a predetermined period, this is determined as a timing for replacement of the equipment. This timing for replacement of the equipment of the first stacker crane 4a is set as every 24 months, for instance.

On the other hand, the replacement timing of the equipments of the second stacker crane 4b having the shorter set used period can be delayed relative to the replacement timing of the equipment of the first stacker crane 4b.

Incidentally, the replacement timing of the equipment is actually determined for each of the various sensors, brakes, etc. Hence, for each of the plurality of equipments, the replacement timing thereof can be made different between the first stacker crane 4a and the second stacker crane 4b.

In this way, by causing the equipment replacement timing of the first stacker crane 4a different from that of the second stacker crane 4b, even when the equipment replacement of the first stacker crane 4a is effected upon expiration of its timing, the second stacker crane 4b can continuously be used for article transporting operations. Conversely, in the event of expiration of the equipment replacement timing of the second stacker crane 4*b*, the first stacker crane 4*a* can continuously be used for article transporting operations.

For replacing the equipment, if this timing happens to be in the middle of an ongoing article transporting operation, the stacker crane 4 will be moved to e.g. an evacuation area upon completion of this article transporting operation, where the equipment replacement operation will be effected. Regarding the evacuation area, though not shown two such areas are provided on opposed sides across the running rail 7 so as to be outside the area of horizontal movement of the stacker crane 4 for effecting article transporting operations.

Further, if the equipment replacement timing of the first stacker crane 4*a* is set as every 24 months, there is set the relationship of Q1:Q2=25:24. Therefore, the equipment replacement timing of the second stacker crane 4*b* can be one month later than that of the first stacker crane 4*a*. And, if an equipment inspection timing when the equipment should be inspected is set as every one month, it becomes possible to cause the equipment replacement timing of the second stacker crane 4*b* to coincide with the equipment inspection timing of the same, so that the equipment inspection and the equipment replacement for the second stacker crane 4*b* can be effected at one time.

Next, with reference to FIGS. 5 through 10, there will be described movements of the two stacker cranes 4 for the simultaneous storage operation, the first individual storage operation, the second individual storage operation, the simultaneous retrieval operation, the first individual retrieval operation, and the second individual retrieval operation.

FIGS. 5 through 10 are side views showing the article storage system with some portions thereof being omitted from the views. At the left end, there are shown the storage/retrieval article support 3 and on the right side of this storage/retrieval article support 3, there is shown the article storage shelf 2.

Figure 5:
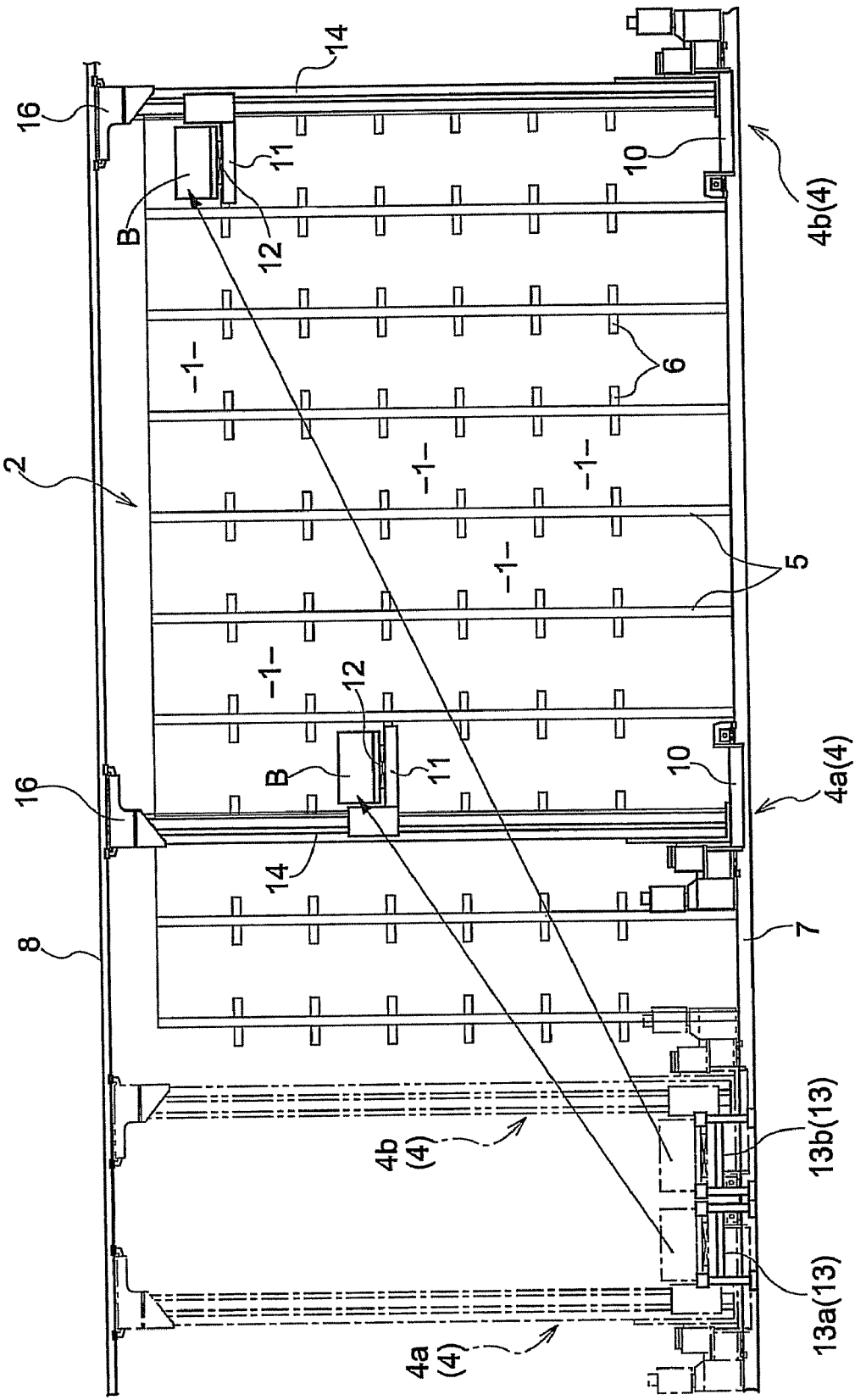
FIG. 5 shows operations of the stacker cranes for a simultaneous storage operation.

First, the movements for the simultaneous storage operation will be described with reference to FIG. 5. In this simultaneous storage operation, both of the two stacker cranes 4, namely, the first stacker crane 4*a* and the second stacker crane 4*b*, are moved for transporting and storing articles.

Incidentally, when this simultaneous storage operation is effected, the articles B will be mounted on both the first carriage 13*a* and the second carriage 13*b*. Of the two articles B, the second carriage 13*b* is used for mounting one article B which is to be stored at a deeper position (storage section) within the article storage shelf 2.

The ground controller 9 issues storage commands to the first crane controller 26A of the first stacker crane 4*a* as well as to the second crane controller 26B of the second stacker crane 4*b*.

The storage command to the first crane controller 26A is a command for storing the article mounted on the first carriage 13*a* into a storage section 1. This command commands a lift target stop position and a running target stop portion relating to a storage/retrieval side article transfer position corresponding to the first carriage 13*a* and a shelf side transfer position corresponding to the storage section 1 which is to store the article B.

Further, regarding the storage section 1 to store the article B, the command is issued such that in the horizontal moving direction of the stacker crane 4, the storage command to the first crane controller 26A may be closer to storage/retrieval article support 3 than the storage command to the second crane controller 26B.

While differing in the respects of the carriage 13 from which the article B is to be received and the storage section 1 to store the article B, the first crane controller 26A and the second crane controller 26B are configured to effect a basically same operation.

The first crane controller 26A, first, as denoted with dot line, effects running control by the running controller 23*a*, lift control by the lift controller 23*b* and transfer control by the transfer controller 23*c* in order to allow the first stacker crane 4*a* to receive the article B mounted on the first carriage 13*a*. Next, as denoted with solid line, the controller 26A effects further running control by the running controller 23*a*, further lift control by the lift controller 23*b* and further transfer control by the transfer controller 23*c* in order to allow the first stacker crane 4*a* to store the received article B into the target storage section 1.

The second crane controller 26B, first, as denoted with dot line, effects running control by the running controller 23*a*, lift control by the lift controller 23*b* and transfer control by the transfer controller 23*c* so as to allow the second stacker 4*b* to receive the article B mounted on the second carriage 13*b* and then, as denoted with solid line, to allow the crane 4*b* to store the received article B into the target storage section 1.

Figure 6:
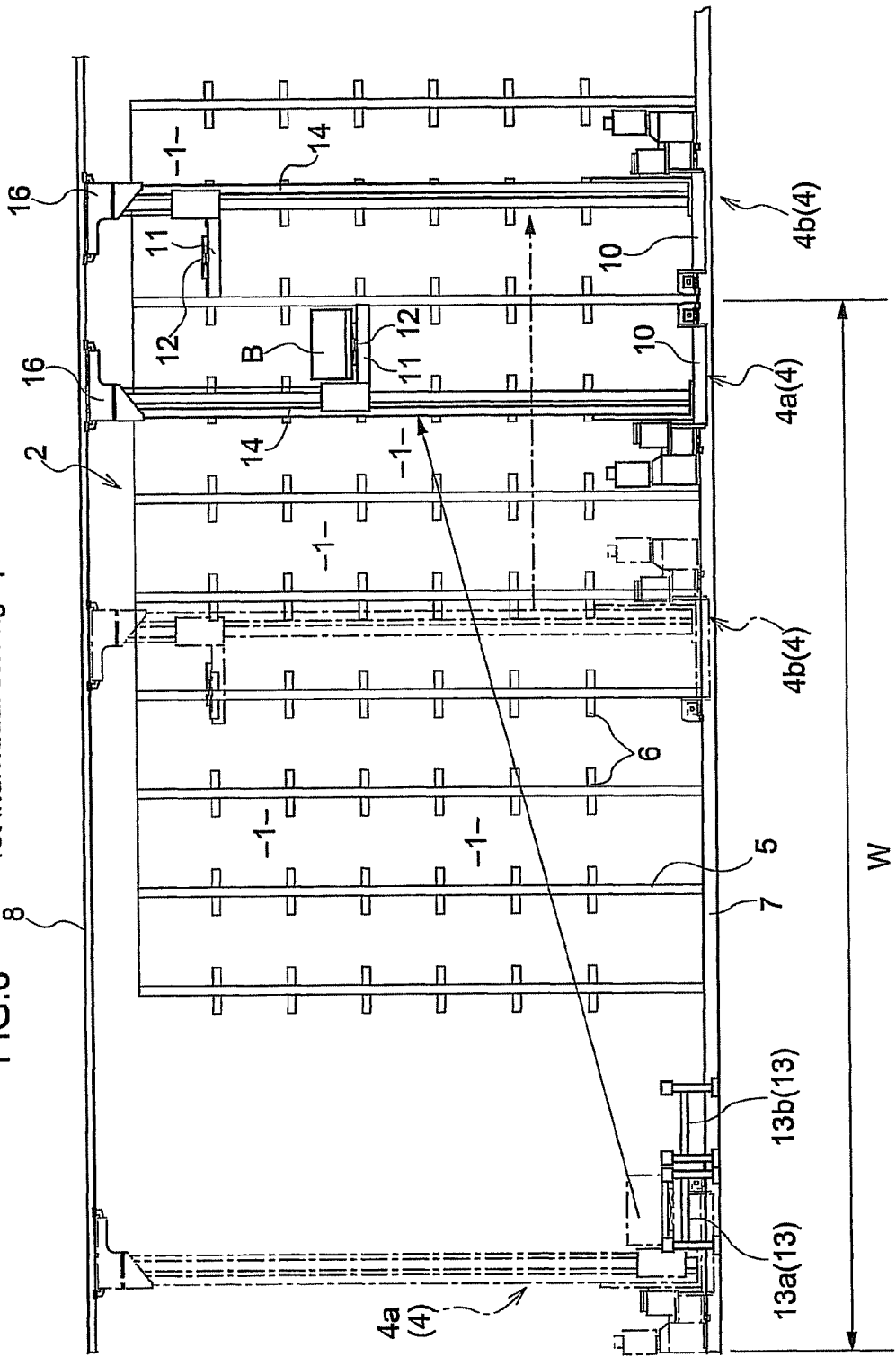
FIG. 6 shows operations of the stacker cranes for a first individual storage operation.

Next, the first individual storage operation will be described with reference to FIG. 6. In this first individual storage operation, one of the two stacker cranes 4 which is located on the side of the storage/retrieval article support 3, namely, the first stacker crane 4*a*, is activated for transporting and storing an article.

The ground controller 9 issues a storage command to the first crane controller 26A and issues also a standby command or an evacuation command to the second crane controller 26B.

The standby command is a command for keeping the second stacker crane 4*b* at its present location.

The evacuation command is for moving the second stacker crane 4*b* out of the article transporting moving area W in which the first stacker crane 4*a* is to be moved for effecting an article transporting operation. And, this evacuation command commands a running target stop position of the storage section which is located most distant outside the article transporting moving area W in the horizontal direction away from the first stacker crane 4*a*.

The ground controller 9, with communication with the associated crane controllers 26, manages the current position of the first stacker crane 4*a* and the current position of the second stacker crane 4*b*, hence, sets the article transporting moving area W for moving the first stacker crane 4*a* for an article transporting operation, based on the position of the storage section 1 to store the article B commanded by the storage command. And, as shown by the solid line in the figure, the ground controller 9 issues the standby command if the current position of the second stacker crane 4*b* is out of the article transporting moving area W. Whereas, the ground controller 9 issues the evacuation command if the current position of the second stacker crane 4*b* is within the article transporting moving area W.

The first crane controller 26A, first, as denoted with dot line, effects running control by the running controller 23*a*, lift control by the lift controller 23*b* and transfer control by the transfer controller 23*c* in order to allow the first stacker crane 4*a* to receive the article B mounted on the first carriage 13*a*. Next, as denoted with solid line, the controller 26A effects further running control by the running controller 23*a*, further lift control by the lift controller 23*b* and further transfer control by the transfer controller 23*c* in order to allow the first stacker crane 4*a* to store the received article B into the target storage section 1.

Upon receipt of the standby command, the second crane controller 26B, as shown by solid line in the figure, causes the second stacker crane 4b to stand by at its current position, without effecting the running control by the running controller 23a, the lift control by the lift controller 23b or the transfer control by the transfer controller 23c.

On the other hand, upon receipt of the evacuation command, as shown by the dot line to the solid line in the figure, the second crane controller 26B effects running control by the running controller 23a so as to move the running cart 10 to the commanded running target stop position outside the article transporting moving range W.

In this way, the operation controlling means H causes the non-selected second stacker crane 4b not selected based on the past operation history varying operation condition to be horizontally moved outside the article transporting moving area W of the first stacker crane 4a selected based on the past operation history varying operation condition.

Figure 7:
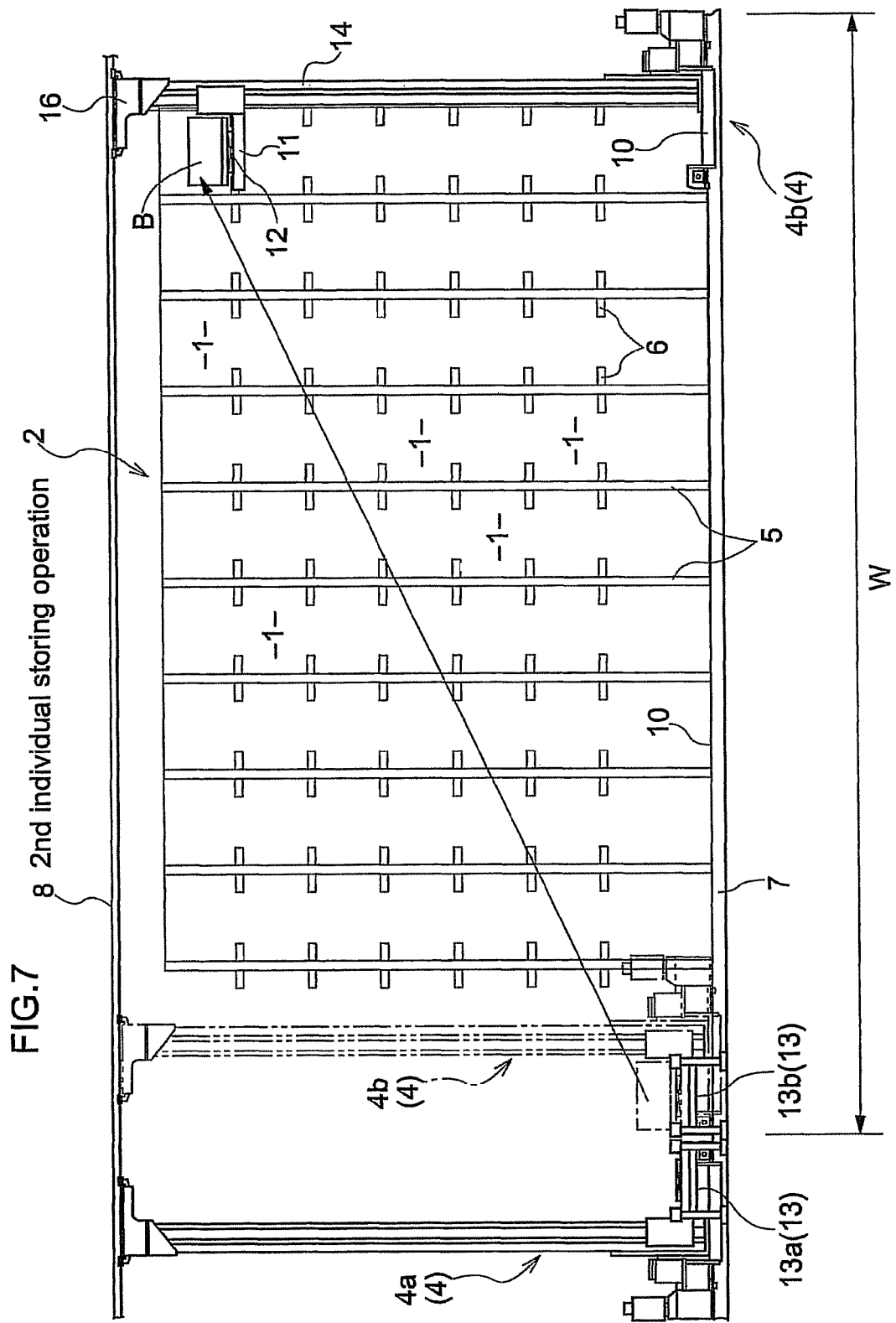
FIG. 7 shows operations of the stacker cranes for a second individual storage operation.

Next, the second individual storage operation will be described with reference to FIG. 7. In this second individual storage operation, one of the two stacker cranes 4 located on the side of the article storage shelf 2, that is, the second stacker crane 4b, is moved for an article transporting operation and subsequent article storage operation.

The ground controller 9 issues an HP evacuation command to the first crane controller 26A and issues also a storage command to the second crane controller 26B of the second stacker crane 4b.

In this HP evacuation command, a running target stop position regarding the storage/retrieval article transfer position is commanded for moving the first stacker crane 4a out of the article transport moving area W in which the second stacker crane 4b is to be moved for effecting the article transporting operation.

The first crane controller 26A effects running control by the running controller 23a so as to locate the running cart 10 at the running target stop position respecting the storage/retrieval article transfer position corresponding to the first carriage 13a.

In this way, the operation controlling means H causes the non-selected first stacker crane 4a not selected based on the past operation history varying operation condition to be horizontally moved outside the article transporting moving area W of the second stacker crane 4b selected based on the past operation history varying operation condition.

The second crane controller 26B first, as denoted with dot line, effects running control by the running controller 23a, lift control by the lift controller 23b and transfer control by the transfer controller 23c in order to allow the second stacker crane 4b to receive the article B mounted on the second carriage 13b. Next, as denoted with solid line, the controller 26B effects further running control by the running controller 23a, further lift control by the lift controller 23b and further transfer control by the transfer controller 23c in order to allow the second stacker crane 4b to store the received article B into the target storage section 1.

Figure 8:
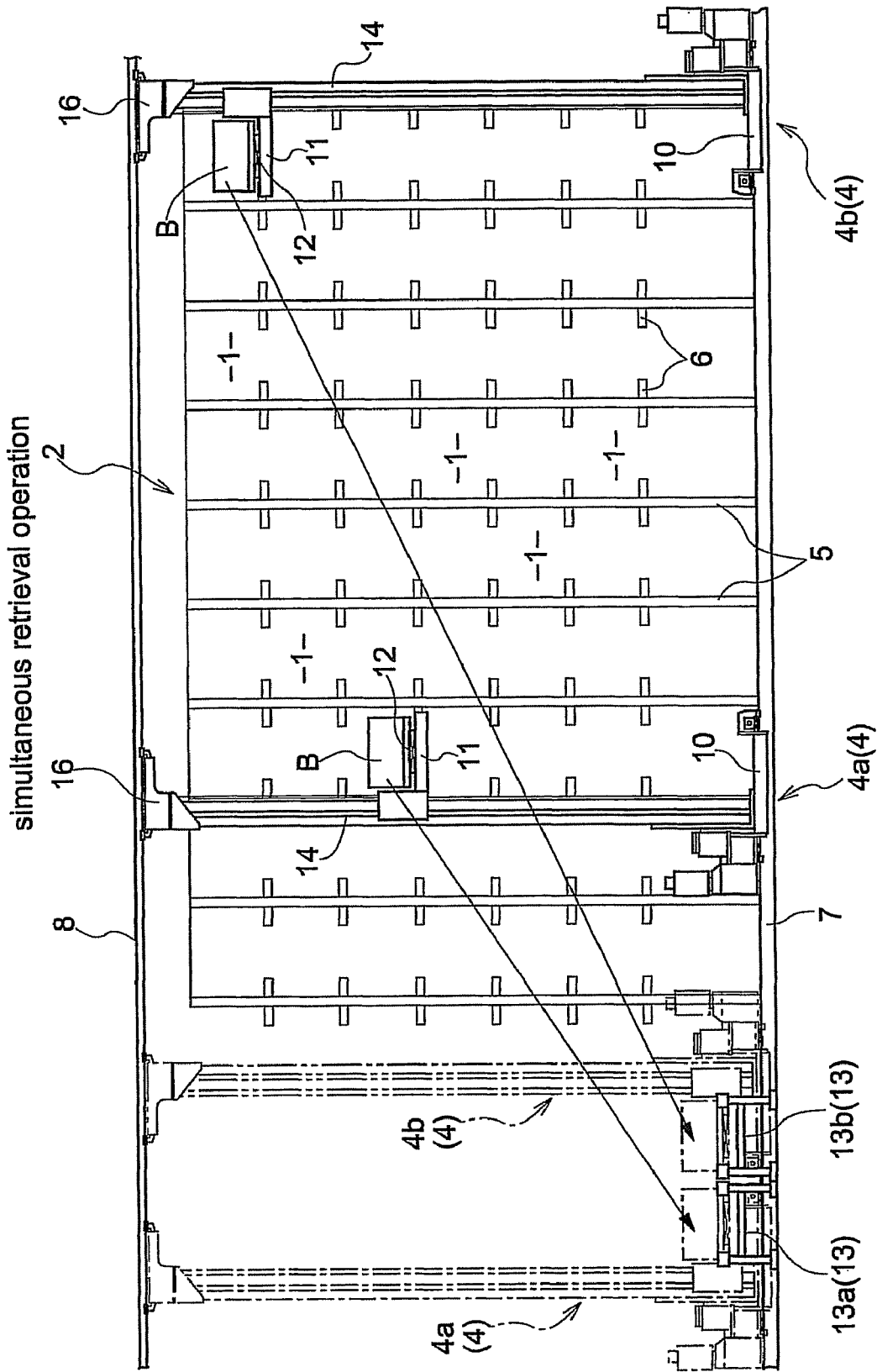
FIG. 8 shows operations of the stacker cranes for a simultaneous retrieval operation.

Next, the simultaneous retrieval operation will be described with reference to FIG. 8. In this simultaneous retrieval operation, both of the two stacker cranes 4, i.e. the first stacker crane 4a and the second stacker crane 4b, are operated for effecting article transporting and retrieving operations.

The ground controller 9 issues a retrieval command to both the first crane controller 28A and the second crane controller 26B.

The retrieval command issued to the first crane controller 26a is a command for retrieving the article B stored at the storage section 1 onto the first carriage 13a. This command commands a lift target stop position and a running target stop position for the shelf side article transfer position corresponding to the storage section 1 from which the article B is to be retrieved and the storage/retrieval article transfer position corresponding to the first carriage 13a.

The retrieval command issued to the second crane controller 26b is a command for retrieving the article B stored at the storage section 1 onto the second carriage 13b. This command commands a lift target stop position and a running target stop position for the shelf side article transfer position corresponding to the storage section 1 from which the article B is to be retrieved and the storage/retrieval article transfer position corresponding to the second carriage 13b.

First, regarding the storage section 1 from which the article B is to be retrieved, the command is issued such that in the horizontal moving direction of the stacker crane 4, the storage command to the first crane controller 26A may be closer to the storage/retrieval article support 3 than the storage command to the second crane controller 26B.

While differing in the respects of the storage section 1 from which the article B is to be retrieved and the carriage 13 onto which the article B is to be transferred, the first crane controller 26A and the second crane controller 26B are configured to effect a basically same operation.

The first crane controller 26A, first, as denoted with dot line, effects running control by the running controller 23a, lift control by the lift controller 23b and transfer control by the transfer controller 23c in order to allow the first stacker crane 4a to retrieve the article B stored at the storage section 1. Next, as denoted with solid line, the controller 26A effects further running control by the running controller 23a, further lift control by the lift controller 23b and further transfer control by the transfer controller 23c in order to allow the first stacker crane 4a to transfer the retrieved article B onto the first carriage 13a.

The second crane controller 26B, first, as denoted with dot line, effects running control by the running controller 23a, lift control by the lift controller 23b and transfer control by the transfer controller 23c so as to allow the second stacker 4b to retrieve the article B stored at the storage section 1 and then, as denoted with solid line, to allow the crane 4b to transfer the retrieved article B onto the second carriage 23b.

Next, the first individual retrieval operation will be described with reference to FIG. 9. In this first individual retrieval operation, the first stacker crane 4a is activated for transporting and retrieving an article.

The ground controller 9 issues a retrieval command to the first crane controller 26A and issues also a standby command or an evacuation command to the second crane controller 26B, depending on whether the current position of the second stacker crane 4b is within the article transporting moving area W or not, just like the first individual storage operation described above.

Figure 9:
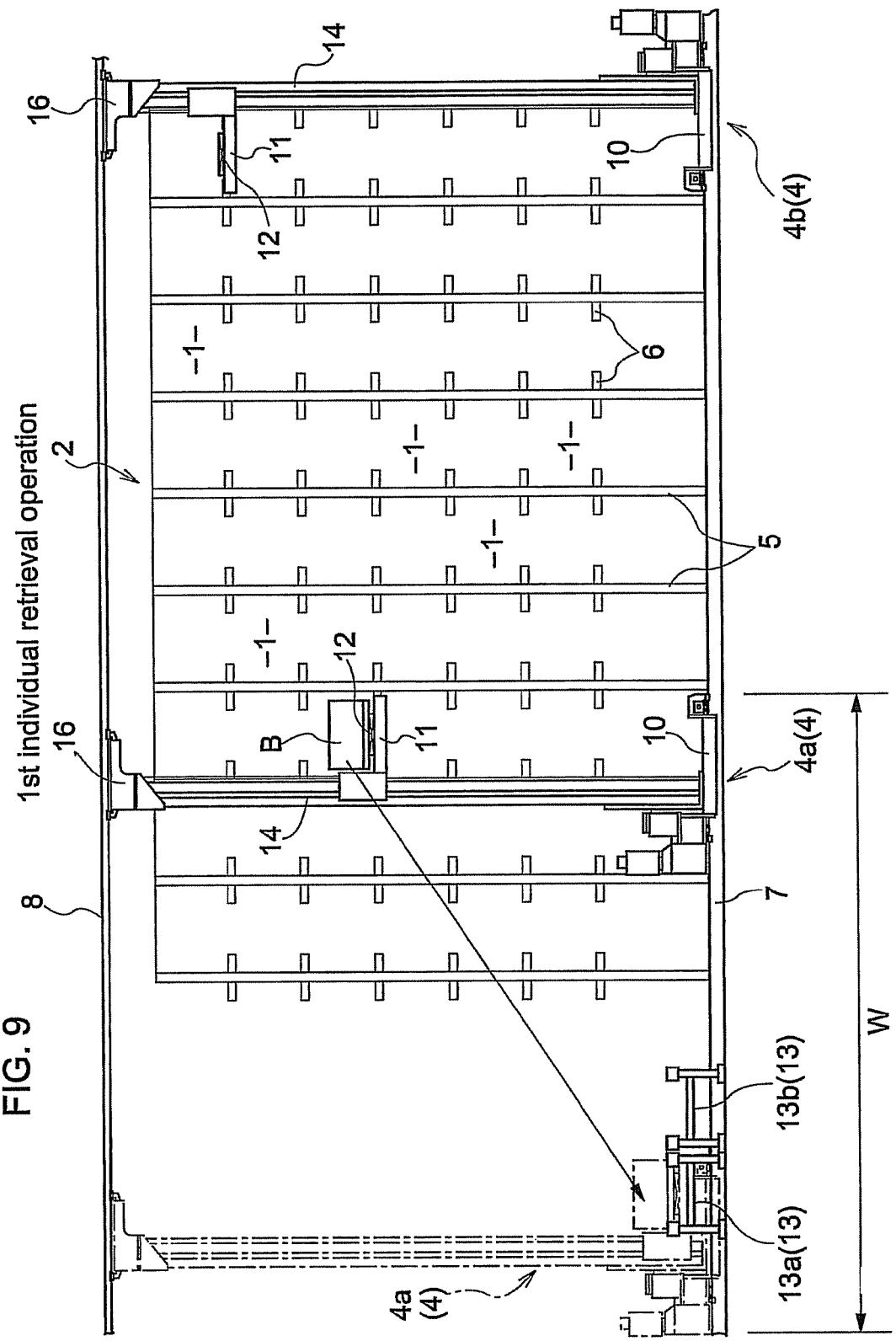
FIG. 9 shows operations of the stacker cranes for a first individual retrieval operation.

Incidentally, FIG. 9 shows a case when the current position of the second stacker crane 4b is out of the article transporting moving area W The first crane controller 26A, first, as denoted with solid line, effects running control by the running controller 23a, lift control by the lift controller 23b and transfer control by the transfer controller 23c in order to allow the first stacker crane 4a to retrieve the article B stored at the storage section 1. Next, as denoted with dot line, the controller 26A effects further running control by the running controller 23a, further lift control by the lift controller 23b and further transfer control by the transfer controller 23c in order to allow the first stacker crane 4a to transfer the retrieved article B onto the first carriage 13a.

Upon receipt of the standby command, the second crane controller 26B causes the second stacker crane 4b to stand by at its current position, without effecting the running control by the running controller 23a, the lift control by the lift controller 23b or the transfer control by the transfer controller 23c. On the other hand, upon receipt of the evacuation command, the second crane controller 26B effects running control by the running controller 23a so as to move the running cart 10 to the commanded running target stop position outside the article transporting moving range W.

In this way, the operation controlling means H causes the non-selected second stacker crane 4b not selected based on the past operation history varying operation condition to be horizontally moved outside the article transporting moving area W of the first stacker crane 4a selected based on the past operation history varying operation condition.

Figure 10:
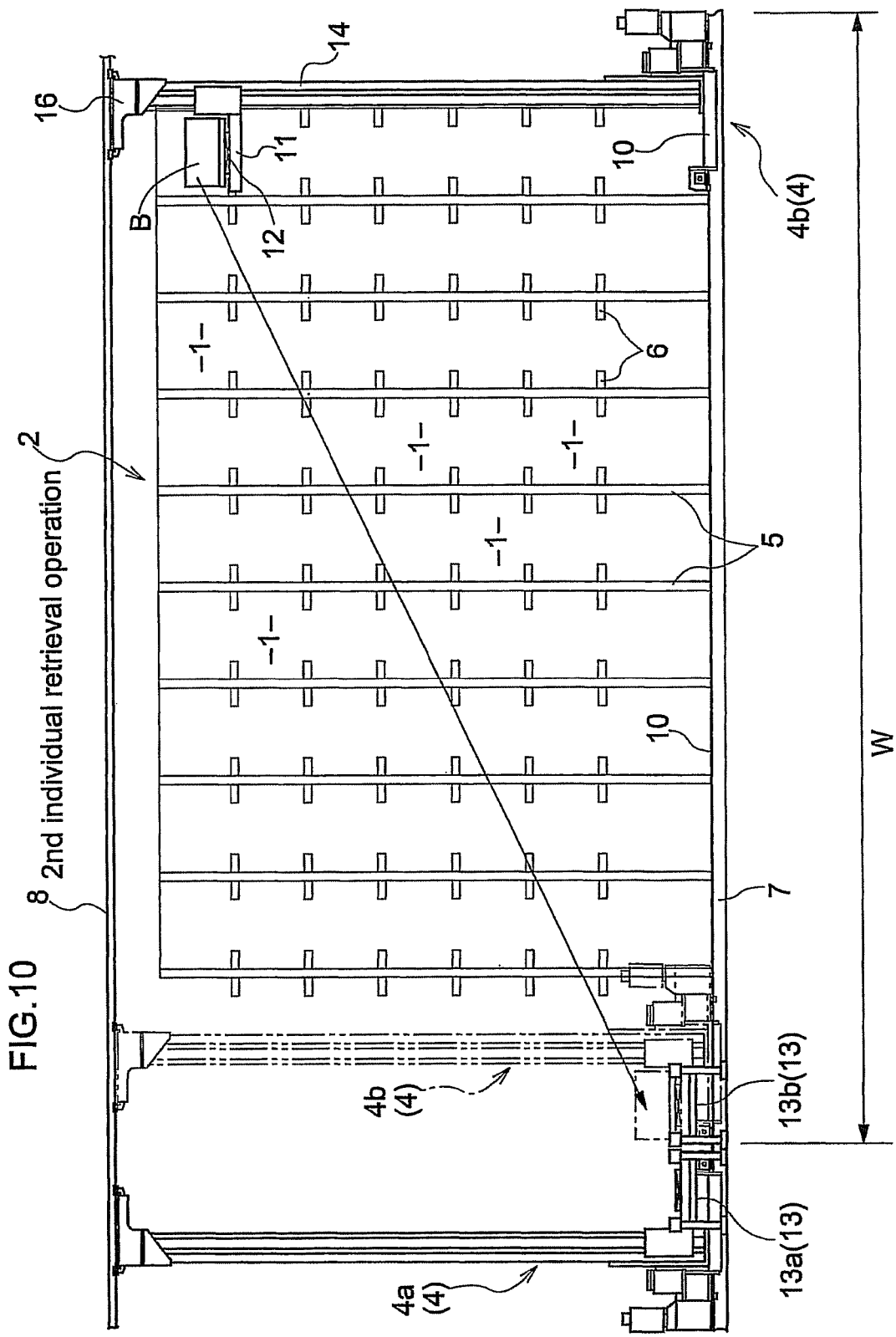
FIG. 10 shows operations of the stacker cranes for a second individual retrieval operation.

Next, the second individual retrieval operation will be described with reference to FIG. 10. In this second individual retrieval operation, the second stacker crane 4b is moved for article transporting and retrieving operation.

The ground controller 9 issues an HP evacuation command to the first crane controller 26A and issues also a retrieval command to the second crane controller 26B of the second stacker crane 4b.

The first crane controller 26A effects running control by the running controller 23a so as to locate the running cart 10 at the running target stop position respecting the storage/retrieval article transfer position corresponding to the first carriage 13a.

In this way, the operation controlling means H causes the non-selected first stacker crane 4a not selected based on the past operation history varying operation condition to be horizontally moved outside the article transporting moving area W of the second stacker crane 4b selected based on the past operation history varying operation condition.

The second crane controller 26B effects running control by the running controller 23a, lift control by the lift controller 23b and transfer control by the transfer controller 23c in order to allow the second stacker crane 4b to retrieve the article B stored at the storage section 1. Next, the controller 26B effects further running control by the running controller 23a, further lift control by the lift controller 23b and further transfer control by the transfer controller 23c in order to allow the second stacker crane 4b to transfer the retrieved article B onto the first carriage 13a.

Next, a second embodiment of the present invention will be described.

In the following discussion of this embodiment, same components as employed in the first embodiment will be designated with the same reference numerals or marks and will not be described here in repetition.

In this second embodiment, the operation controlling means H, in the case of selecting one of the two stacker cranes 4 for causing it to effect an article transfer operation, makes selection of one of the two stacker cranes 4 for its article transfer operation, based on a "past operation history identifying operation condition" for causing the past operation histories of the two stacker cranes 4 for the purpose of rendering replacement timings of equipments (replaceable parts) of the respective stacker cranes 4 identical to each other.

The operation controlling means H is adapted also to control operations of the two stacker cranes 4 such that the non-selected stacker crane 4 not selected based on the past operation history identifying operation condition is moved out of the article transporting moving area in which the stacker crane 4 selected based on the past operation history identifying operation condition.

In this way, based on the article transport request information and the past operation history identifying operation condition, the operation controlling means H selects and executes one of a simultaneous storage operation, a first individual storage operation, a second individual storage operation, a simultaneous retrieval operation, a first individual retrieval operation, and a second individual retrieval operation.

The simultaneous storage operation and the simultaneous retrieval operation are the article transporting operations of the type for selecting both of the two stacker cranes 4 for causing them to effect article transporting operations.

The first individual storage operation and the first individual retrieval operation are the article transporting operations of the further type for selecting the first stacker crane 4a of the two stacker cranes 4 for causing it to effect an article transporting operation.

The second individual storage operation and the second individual retrieval operation are the article transporting operations of the still further type for selecting the second stacker crane 4b of the two stacker cranes 4 for causing it to effect an article transporting operation.

Figure 11:
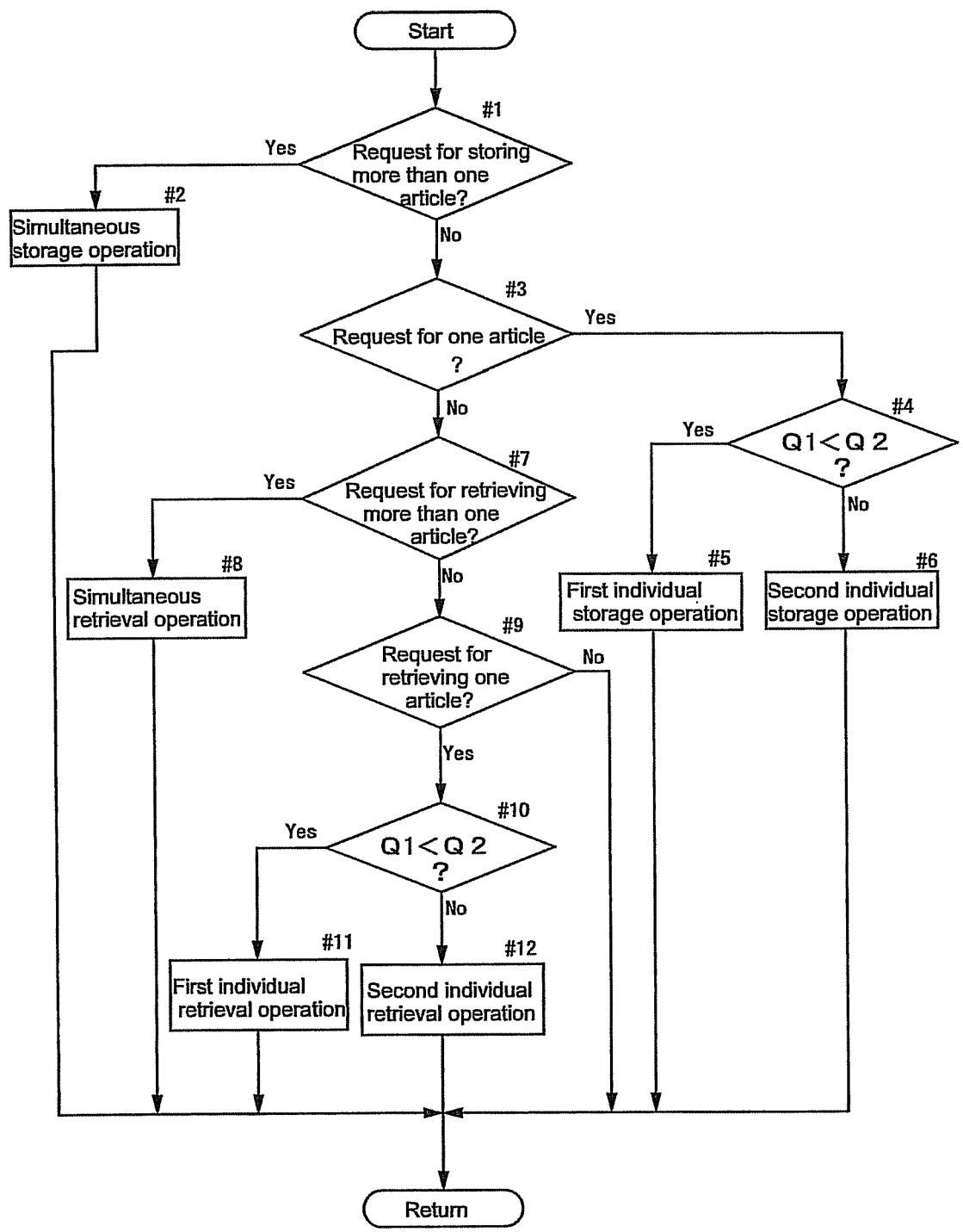
FIG. 11 is a flowchart illustrating control operations by operation controlling means relating to a second embodiment.

Next, with reference to the flowchart shown in FIG. 11, there will be described which operation of the plurality of operations the operation controlling means H selects and effects, based on the article transport request information and the past operation history identifying operation conditions.

When the article transport request information requests storage of a plurality of articles B, the operation controlling means H selects and effects the simultaneous storage operation (steps #1 and 2).

When the article transport request information requests storage of one article B, the operation controlling means H checks whether the first past operation history Q1 of the first stacker crane 4a is smaller than the second past operation history Q2 of the second stacker crane 4b or not (steps #3, 4). If it is determined that the first past operation history Q1 is smaller than the second past operation history Q2, the operation controlling means H selects and effects the first individual storage operation (step #5). Whereas, if it is determined that the first past operation history Q1 is larger than the second past operation history Q2, the operation controlling means H selects and effects the second individual storage operation (step #6).

When the article transport request information requests retrieval of a plurality of articles B, the operation controlling means H selects and effects the simultaneous retrieval operation (steps #7, 8).

When the article transport request information requests retrieval of one article B, the operation controlling means H checks whether the first past operation history Q1 of the first stacker crane 4a is smaller than the second past operation history Q2 of the second stacker crane 4b or not (steps #9, 10). If it is determined that the first past operation history Q1 is smaller than the second past operation history Q2, the operation controlling means H selects and effects the first individual retrieval operation (step #11). Whereas, if it is determined that the first past operation history Q1 is larger than the second past operation history Q2, the operation controlling means H selects and effects the second individual retrieval operation (step #12).

The equipments ("replaceable parts) of the stacker cranes 4 comprise various sensors, brakes, etc, which are worn with use in article transporting operations, etc.

As the operation controlling means H makes selection between the two stacker cranes 4 for effecting an article transporting operation(s), based on the past operation history identifying operation conditions, the first past operation history Q1 of the first stacker crane 4a and the second past operation history Q2 of the second stacker crane 4b can be identical to each other. Therefore, it is possible to cause the equipment replacement timing of the first stacker crane 4a to coincide with the equipment replacement timing of the second stacker crane 4b. And, with expiration of the replacement timing as the past operation history reaches the past operation period set for replacement, the equipment replacement timing of the first stacker crane 4a can be identical to the equipment replacement timing of the second stacker crane 4b.

And, even if the first past operation history Q1 of the first stacker crane 4a is not completely identical to the second past operation history Q2 of the second stacker crane 4b, by selecting between the two stacker cranes 4 for effecting an article transporting operation, there will occur no significant difference in the degree of wear between the equipment of the first stacker crane 4a and the equipment of the second stacker crane 4b.

Therefore, the equipment replacement timing of the first stacker crane 4a can still be identical to the equipment replacement timing of the second stacker crane 4b.

Incidentally, the replacement timing of the equipment is actually determined for each of the various sensors, brakes, etc. Hence, for each of the plurality of equipments, the replacement timing thereof can be made identical for the first stacker crane 4a and the second stacker crane 4b.

In this way, by causing the equipment replacement timing of the first stacker crane 4a identical to that of the second stacker crane 4b, the replacement operation of the equipment of the first stacker crane 4a and the replacement operation of the equipment of the second stacker crane 4b can be effected at one time, thus facilitating the equipment replacement operations.

For replacing the equipment, if this happens to be in the course of an ongoing article transporting operation, the stacker crane 4 will be moved to e.g. an evacuation area after completion of this article transporting operation, where the equipment replacement operation will be effected. Regarding the evacuation area, though not shown, two such areas are provided on opposed sides across the running rail 7 so as to be outside the area of horizontal movement of the stacker crane 4 for effecting article transporting operations.

OTHER EMBODIMENTS (1) In the foregoing embodiment, two stacker cranes 4 are moved horizontally along the same running rail 7. Instead, as shown in FIG. 11 for instance, two running rails 7 can be provided parallel with each other between the storage/retrieval article support 3 and the article storage shelf 2, so that the two stacker canes 4 may be moved horizontally along the two different running rails 7.

In this case, the first stacker crane 4a located on the left side in the figure will effect an article transporting operation between the first storage/retrieval article support 3a and the first article storage shelf 2a; whereas the second stacker crane 4b located on the right side in the figure will effect an article transporting operation between the second storage/retrieval article support 3b and the second article storage shelf 2b. And, though not shown, there is provided a storage/retrieval conveyer extending between the article entrance/exit locations, the first storage/retrieval article support 3a and the second storage/retrieval article support 3b. For instance, in case the first stacker crane 4a is operated for an article transporting operation for storage, this storage/retrieval transporter will transport an article from the article entrance/exit to the first storage/retrieval article support 3a.

(2) In the foregoing first embodiment, the past operation history varying operation condition is set as a target ratio between respective past operation histories of the two stacker cranes 4. And, the operation controlling means H makes selection between the two stacker cranes 4 for effecting an article transporting operation(s) in such a manner that the ratio between the past operation histories of the two stacker cranes 4 may become the target ratio. Instead, this past operation history varying operation condition can be a variety of other conditions. For instance, this condition can be a condition which specifies the number of cycles of article transporting operations, in each of which the first stacker crane 4a is operated for a first set number of article transporting operations and then the second stacker crane 4b is operated for a second set number of article transporting operations.

(3) In the first embodiment described above, the target ratio between the first past operation history Q1 of the first stacker crane 4a and the second past operation history Q2 of the second stacker crane 4b is set as: Q1:Q2=25:24. This target ratio can be appropriately set to any other value.

(4) In the foregoing embodiment, when the used period of the equipment of the first stacker crane 4a reaches a predetermined period, this is taken as the expiration of the replacement timing of this equipment. Instead, realization of a particular condition of the equipment taken as the expiration of its replacement timing can vary. For instance, arrival of the used times of the first stacker crane 4a at a predetermined number can be taken as the expiration of the replacement timing.

(5) In the foregoing embodiment, when the operation controlling means H has selected, selects the stacker crane 4 for effecting an article transporting operation based on the past operation history varying operation condition. Instead, not only when one of the two stacker cranes 4 is selected based on article transport request information, but also when both of these two stacker cranes 4 are selected based on article transport request information, the stacker crane 4 for effecting an article transporting operation based on the past operation history varying operation condition may be selected.

(6) In the foregoing embodiment, the running cart 10 mounts the single lift post 14 erect for guiding and supporting the lift table 11 with the table 11 being liftable up/down relative thereto. However, the number of the lift post 14 can vary appropriately. For instance, the lift post 14 can be disposed erect on each of the opposed ends of the running cart 10 in the horizontal moving direction.

(7) In the foregoing embodiment, for detecting the running position of the running cart 10 on the running track and the lift position of the lift table 11, the running rotary encoder 23 and the lift rotary encoder 23 are provided. Instead, the running position of the running cart 10 on the running track and the lift position of the lift table 11 can be detected with use of e.g. a laser range finder. And, various kinds of sensors also can be employed for this purpose.

(8) In the foregoing embodiment, there are provided the two stacker cranes 4. However, the invention may be implemented with provision of three or more stacker cranes 4. For instance, when three stacker cranes 4 are used, by making the past operation history of one stacker crane 4 different from those of the other two stacker cranes 4, it is possible to render the equipment replacement timing of this one stacker crane 4 different from those of the other two stacker cranes. Or, it is also possible to render the past operation histories of the stacker cranes 4 all different from each other.

(9) In the foregoing embodiment, the inventive article transporting apparatus is applied to the article storage system having a plurality of stacker cranes 4. Instead, the inventive apparatus may be applied to an article storage system including a track extended across and between a plurality of article transfer locations and a plurality of article transporting carts as movable bodies moving on this track. In this way, the invention may be applied to a variety of systems including article transporting movable bodies movable across and between a plurality of article transfer locations.

(10) In the second embodiment described above, the operation controlling means H manages the respective past operation histories Q1, Q2 of the two stacker cranes 4 such that these past operation histories Q1 and Q2 may be identical. And, for rendering the past operation histories Q1 and Q2 identical to each other, the operation controlling means H makes selection between the two stacker cranes 4 for effecting article transporting operation. Instead, the operation controlling means H can select the two stacker cranes 4 alternatively for effecting article transporting operation so that the past operation histories Q1, Q2 thereof may be identical.

(11) In the second embodiment described above, the operation controlling means H, when selecting one of the two stacker crane 4 for effecting an article transporting operation, makes the selection of this stacker crane 4, based on the past operation history identifying operation condition. Instead, not only when one of the two stacker cranes 4 is selected based on article transport request information, but also when both of these two stacker cranes 4 are selected based on article transport request information, the stacker crane 4 for effecting an article transporting operation based on the past operation history identifying operation condition may be selected.

What is claimed is:

1. An article transporting apparatus comprising:
   a plurality of article transporting movable bodies movable along a single track between a plurality of article transfer locations; and
   operation controlling means for controlling operations of the movable bodies for causing the bodies to effect article transporting operations in accordance with an article transport request information;
   wherein said operation controlling means selects a movable body from the plurality of movable bodies for an article transporting operation based on an operation condition configured to cause the movable bodies to have substantially the same past operation histories so as to have a same timing for replacing a replaceable part for each of the plurality of movable bodies and moves the movable body or bodies, that is/are not selected based on the operation condition, out of an article transporting movable area in which the selected movable body is moved for effecting the article transporting operation,
   wherein the operation condition involves comparing a past operation history of one of the plurality of movable bodies with a past operation history of another of the plurality of movable bodies; and
   wherein the operation controlling means selects for an article transporting operation a movable body having a smaller past operation history based on the comparison.

2. The article transporting apparatus according to claim 1, wherein based on said article transport request information, said operation controlling means selects either all of the movable bodies or not all of the movable bodies for an article transporting operation; and
   wherein said operation controlling means selects a movable body for the article transporting operations based on said operation condition when not all of the movable bodies are selected.

3. The article transporting apparatus according to claim 1, wherein said replaceable part is at least one of a brake and a sensor.

4. The article transporting apparatus according to claim 1, wherein said past operation history of a particular movable body is obtained based on one or more of a number of article transporting operations effected by the movable body, a sum of operation periods of the particular movable body and a sum of horizontal distances covered by the particular movable body.

5. A method of operating an article transporting apparatus having a plurality of article transporting movable bodies movable along a single track between a plurality of article transfer locations and operation controlling means for controlling operations of the movable bodies, the method comprising the steps of:
   determining a past operation history of each of the movable bodies;
   selecting a movable body from the plurality of movable bodies for an article transporting operation based on a operation condition configured to cause the movable bodies to have substantially the same past operation histories so as to have a same timing for replacing a replaceable part for each of the plurality of movable bodies;
   causing the selected movable body to effect the article transporting operation; and
   moving the movable bodies, that are not selected based on the operation conditions, out of an article transporting movable area in which the selected movable body is moved for effecting the article transporting operation,
   wherein the operation condition involves comparing a past operation history of one of the plurality of movable bodies with a past operation history of another of the plurality of movable bodies, and
   wherein the step of selecting includes selecting a movable body having a smaller past operation history based on the comparison.

6. The method according to claim 5, wherein in performing the step of selecting a movable body, the operation control means selects either all of the movable bodies or not all of the movable bodies for the article transporting operations based on said article transport request information; and
   wherein the step of selecting a movable body for the article transporting operations is performed based on said operation condition when not all of the movable bodies are selected.

7. The method according to claim 5, wherein said replaceable part is at least one of a brake and a sensor.

8. The method according to claim 5, wherein said past operation history of a particular movable body is obtained based on one or more of a number of article transporting operations effected by the movable body, a sum of operation periods of the movable body, and a sum of horizontally moved distances.

* * * * *

UNITED STATES PATENT AND TRADEMARK OFFICE
CERTIFICATE OF CORRECTION

| | | |
|---|---|---|
| PATENT NO. | : 8,150,546 B2 | Page 1 of 1 |
| APPLICATION NO. | : 12/417091 | |
| DATED | : April 3, 2012 | |
| INVENTOR(S) | : Kazushi Tsujimoto | |

It is certified that error appears in the above-identified patent and that said Letters Patent is hereby corrected as shown below:

Column 1, Line 11, delete "2006-179339" and insert -- 2005-179339 --

Signed and Sealed this
Twenty-fourth Day of July, 2012

David J. Kappos
*Director of the United States Patent and Trademark Office*